United States Patent [19]

Oates et al.

[11] Patent Number: 4,573,215

[45] Date of Patent: Feb. 25, 1986

[54] OPTICAL DATA DISTRIBUTION NETWORK WITH LISTEN-WHILE-TALK CAPABILITIES

[75] Inventors: Robert M. Oates, Murrysville; Herbert C. Cooper, North Huntingdon; Kirk D. Houser, Ross Township, Allegheny County, all of Pa.

[73] Assignee: Westinghouse Electric Corp., Pittsburgh, Pa.

[21] Appl. No.: 582,208

[22] Filed: Feb. 21, 1984

[51] Int. Cl.$^4$ .............................................. H04B 9/00
[52] U.S. Cl. ................................ 455/607; 350/96.15; 350/96.16; 455/612
[58] Field of Search ............... 455/606, 607, 612, 78, 455/79, 88; 350/96.15, 96.16; 370/1, 3, 4, 32

[56] References Cited

U.S. PATENT DOCUMENTS 4,494,244  1/1985  Arndt et al. ......................... 455/78

OTHER PUBLICATIONS

Quarmby–"Data Highway Devices"–Electro Optics/Laser Internat. '76 UK, Mar. 9–11, 1976, pp. 61–63.
Feldman–"An All Optical Telephone"–Conf. 1981 Intern. Conf. on Communications, Denver–Jun. 1981–pp. 31.5/1–4.
Shibukawa et al.–"Compact Optical Circulator"–Applied Optics–vol. 18, #12–(Nov. 1979), pp. 3700–3703.
Minemura et al.–"Two Way Transmission"–Electronics Letter–vol. 14, #11, May 25, 1978, pp. 340–342.

Primary Examiner—Joseph A. Orsino, Jr.
Attorney, Agent, or Firm—W. E. Zitelli

[57] ABSTRACT

An optical data distribution network including a plurality of drops and apparatus for distributing optical data signals to the plurality of drops wherein each drop has listen-while-talk capability is disclosed. Each drop comprises a single length of optical fiber for propagating transmit and receive optical signals between a directional coupler and the distributing apparatus. The directional coupler is operative to direct the transmit optical signals from an optical transmitter to the single length of optical fiber and to direct the receive optical signals from the single length of optical fiber to a first optical receiver. Each drop further includes a second optical receiver coupled to the directional coupler for receiving optical signals transmitted by the optical transmitter as directed to the second optical receiver by the directional coupler.

5 Claims, 2 Drawing Figures

OPTICAL DATA DISTRIBUTION NETWORK WITH LISTEN-WHILE-TALK CAPABILITIES

BACKGROUND OF THE INVENTION

The invention relates generally to optical data distribution networks, and more particularly to a network including a plurality of drops and means for distributing optical data signals to the plurality of drops with each drop having listen-while-talk capability.

An optical data distribution network may include a plurality of drops and apparatus like a transmissive or reflective star, for example, for distributing optical data signals to the plurality of drops. An exemplary distribution network having a star configuration is shown in the block diagram illustration of FIG. 1. The optical signal distribution apparatus for this example includes an N port reflective star 10. A plurality of drops D1 through DN are coupled to the star 10 in such a manner as to permit any drop Di to communicate with any other Dj. Each drop, as exemplified by drop D1, for example, may include a transceiver 12 for transmitting and receiving optical signals. The transceiver 12 may be coupled to an optical signal directional coupler 14 which, in turn, may be coupled to the distributing apparatus 10 with a single length of optical fiber 16 for propagating transmit and receive optical signals between the directional coupler and the distributing apparatus 10. Each drop may further include optical connectors 18 and 20 for coupling the length of optical fiber 16 between the distributing apparatus 10 and directional coupler 14.

In operation, the optical directional coupler 14 of a drop is operative to direct the transmit optical signals from its transceiver unit 12 via an optical fiber line 22, for example, to the single length of optical fiber 16 thereof and to direct the receive optical signals from the fiber 16 to its transceiver unit 12 via an optical fiber line 24, for example. In the present embodiment, the reflective star 10 passively distributes the optical signals from one drop to the other drops. Some of the drops may include a drop interface unit, like that shown at 26 in drop D1, to permit communications with other optical networks or external equipment.

In some networks, there may be imposed a requirement that a drop be able to listen to its own transmission, i.e. have listen-while-talk capability. This capability may be used to provide assurance that the drop is operating properly. Theoretically, a network like that described in connection with the embodiment of FIG. 1, for example, should be able to meet this requirement. That is, the transmitted optical signal of a drop reflects from the star 10 and propagates back through its own single length of optical fiber 16 in the opposite direction and is split to a receiver in the transceiver unit 12 via directional coupler 14 and line 24, for example. However, in an actual installation, the various optical components of a drop may be connected together using optical connectors like 18 and 20, which may be imperfect. A typical optical connector may have an insertion loss of 1 db which means that about 80% of the power is transmitted through and 20% may be lost or reflected back. Accordingly, the reflected optical signal from an optical connector may cause an undesirable interference with the reflected signal from the star 10.

More specifically, referring to FIG. 1, the reflected component of the transmit signal from connector 18, for example, propagates back through the directional coupler 14 to the transceiver unit 12. In addition, components of the transmit signal, which travel through the length of fiber 16, are also reflected back from the optical connector 20 and from the star 10 through the optical fiber 16 and the directional coupler 14 to the transceiver unit 12. Moreover, all of the aforementioned reflected components of the transmit signal are received at the transceiver 12 delayed in time from each other because of the propagation time of light, i.e., the varying traveling distances of optical signals through the optical fiber 16. Accordingly, the resulting composite reflected transmit signal observed by the transceiver unit 12 may be badly distorted and unusuable as an accurate indication of the actual signal being transmitted thereby.

From the foregoing, it is apparent that, in practice, optical data distribution networks having drop configurations of the aforementioned type are generally not effective to achieve the desired listen-while-talk capability. Accordingly, applicants' inventive aspects are intended for the purpose of avoiding the foregoing described for each drop of the network, especially with little increase in cost per drop.

SUMMARY OF THE INVENTION

An optical data distribution network includes a plurality of drops and apparatus, preferably a reflective star, for distributing optical data signals to the plurality of drops with each drop having listen-while-talk capability. Each drop comprises a single length of optical fiber for propagating transmit and receive optical signals between a directional coupler and the distributing apparatus. The directional coupler in each drop is operative to direct the transmit optical signals from an optical transmitter to the single length of optical fiber and to direct the receive optical signals from the single length of optical fiber to a first optical receiver. Also included in each drop is a second optical receiver which is also coupled to the directional coupler for receiving optical signals transmitted by the optical transmitter as directed to the second optical receiver by the directional coupler.

Each drop may also include apparatus for enabling and disabling the first and second optical receivers thereof in accordance with the transmissions of the optical transmitter. More specifically, the first optical receiver may be disabled and the second optical receiver enabled during periods of transmission by the optical transmitter. Conversely, during periods of non-transmission by the optical transmitter, the second optical receiver may be disabled and the first optical receiver enabled.

DESCRIPTION OF THE PREFERRED EMBODIMENT

Figure 1:
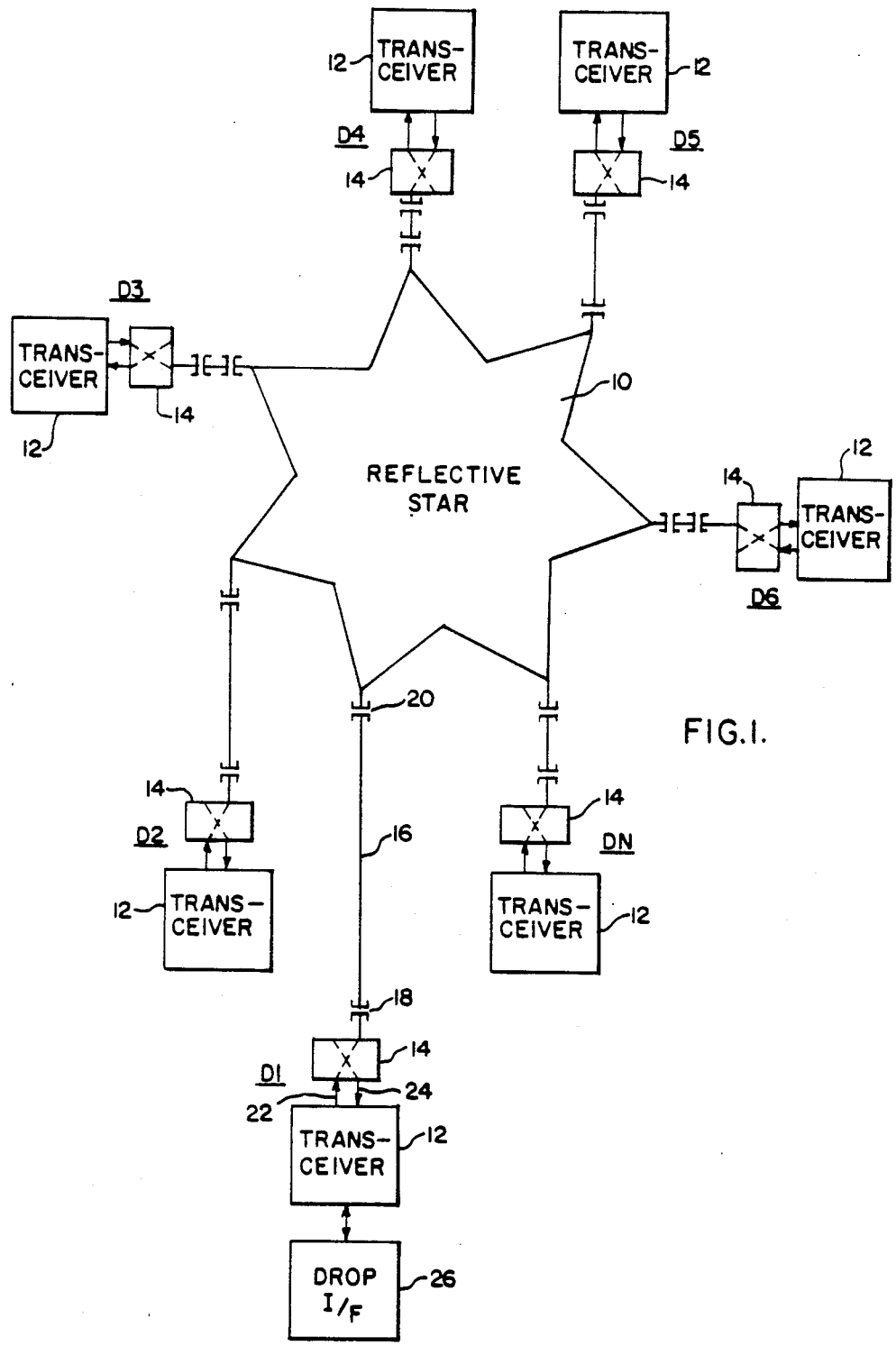
FIG. 1 is a block diagram illustration of an exemplary optical data distribution network having a star configuration.
Figure 2:
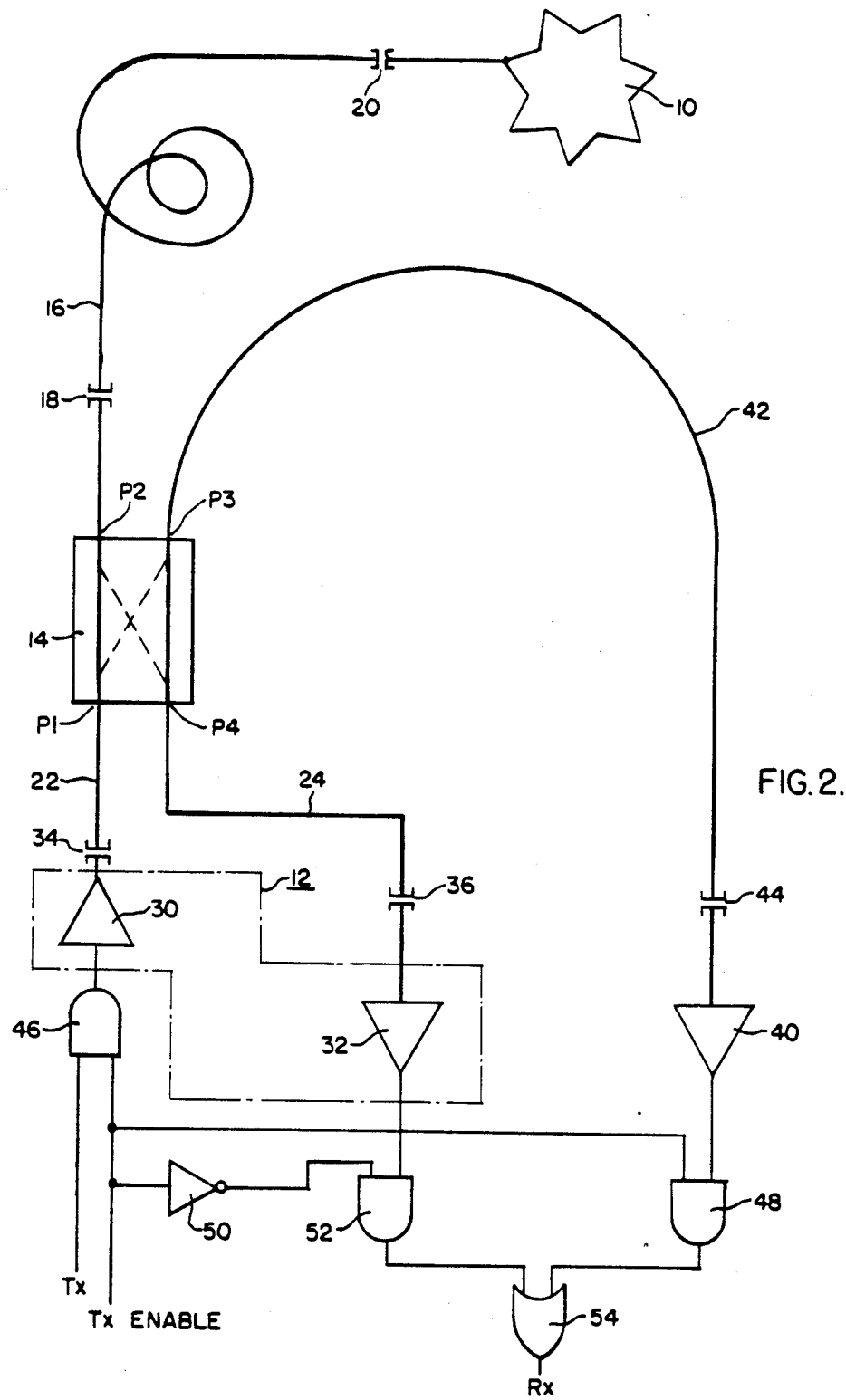
FIG. 2 is an illustrative schematic of a typical drop of an optical data distribution network suitable for embodying the principles of the present invention.

FIG. 2 depicts an illustrative schematic embodiment of a typical drop in an optical data distribution network suitable for use in describing the principles of the present invention. The drop includes the length of optical fiber 16 which may be on the order of 2,000 feet or so, for example, and may be similar to the fiber optic cable type manufactured by SIECOR Corp., having the Model No. 144 and trademarked as FAT FIBER. The optical connectors 18 and 20 coupling the length of optical fiber 16 to the directional coupler 14 and reflective star 10, respectively, may be accomplished utilizing conventional techniques like fusing fibers together, for example. The directional coupler 14 may be similar to the type manufactured by CANSTAR (a division of Canadian Wire Company) having the Model No. TC4 which is a 4-port coupler having ports P1-P4.

Moreover, the transceiver 12 includes a conventional optical transmitter 30 capable of producing optical power on the order of 100 microwatts, for example, and a main receiver 32 which may have a sensitivity on the order of 20 nanowatts, for example. The optical transmitter 30 may be coupled to port P1 of the coupler 14 through a short optical fiber 22 and another optical connector 34. Similarly, the optical receiver 32 may be coupled to port P4 of the coupler 14 through another short optical fiber 24 and optical connector 36. In addition, the single length of optical fiber 16 may be coupled through the optical connector 18 to port P2 of the coupler 14.

In accordance with one aspect of the present invention, a second optical receiver 40 is included in each drop and in the present embodiment is coupled to the port P3 of the coupler 14 through a short length of optical fiber 42 and another optical connector 44. The second receiver 40 may be less sensitive than the receiver 32, say having a sensitivity on the order of 20 microwatts, for example. In this configuration, the optical directional coupler 14 is operative to split the transmit optical power entering port P1 between the ports P2 and P3 and in addition, is operative to split the receive optical power entering port P2 between ports P1 and P4. Thus, the second optical receiver 40 is operative to receive optical signals transmitted by the optical transmitter 30 as directed thereto by the directional coupler 14, thereby providing listen-while-talk capabilities unhampered by interfering reflections from the various optical connectors like 18 and 20, for example. Since the transmit optical signal in the present embodiment is actually fed directly to the second receiver 40, the corresponding drop can establish that the data format of the transmitted signal is correct and that the optical transmitter 30 is functioning properly.

An additional aspect of the present invention includes logic circuitry for each drop for enabling and disabling its first and second optical receivers 32 and 40 in accordance with the transmissions of its optical transmitter 30. More specifically, the transmit signal Tx may be logically with a transmission enabling signal Tx ENABLE in an AND gate 46 prior to driving the optical transmitter 30. The transmit enable signal Tx ENABLE may also be coupled to one input of another AND gate 48. Still further, the complement of the transmit enable signal effected by an inverter 50 may be coupled to one input of still another AND gate 52. Moreover, the receive signals from the outputs of the optical receivers 32 and 40 may be coupled to the other inputs of the AND gates 52 and 48, respectively. The outputs of the AND gates 52 and 48 may be provided to an OR gate 54, the output of which being the receive signal Rx. During periods of transmission as governed in the present embodiment by the TX ENABLE signal, the main optical receiver 32 is disabled from passing its signal through the AND gate 52 and OR gate 54 and the secondary optical receiver 40 is enabled to pass its output or receive signal through the AND gate 48 and OR gate 54 as the observable receive signal Rx. Conversely, during periods of non-transmission by the optical transmitter 30, the secondary optical receiver is disabled and the main optical receiver 32 is enabled to pass its output signal through the AND gate 52 and OR gate 54 to be observed as the receive signal Rx.

In summary, a fourth port of the directional coupler 14, normally unused, provides a connection to feed the transmitted optical signal to a second receiver 40 which may be less sensitive, and thus less expensive than the main receiver 32. When the drop is not transmitting, the main receiver 32 is enabled and its output signal is coupled to the drop receive line Rx. Conversely, when the drop is transmitting the secondary receiver is similarly enabled and the drop can monitor its own transmission, thus accomplishing a substantially effective listen-while-talk capability for each drop of the network.

What is claimed is:

1. An optical data distribution network including a plurality of drops and means for distributing optical data signals to said plurality of drops, each drop having listen-while-talk capability, each drop comprising:
    an optical signal directional coupler;
    an optical transmitter, coupled to said directional coupler, for transmitting optical signals thereto;
    a first optical receiver, coupled to said directional coupler, for receiving optical signals therefrom;
    a single length of optical fiber for propagating transmit and receive optical signals between said directional coupler and said distributing means, said directional coupler operative to direct said transmit optical signals from said optical transmitter to said single length of optical fiber and to direct said receive optical signals from said single length of optical fiber to said first optical receiver;
    a second optical receiver, coupled to said directional coupler, for receiving optical signals transmitted by said optical transmitter as directed to said second optical receiver by said directional coupler, thereby providing listen-while-talk capability; and
    means for selecting between said first and second optical receivers to choose a receive signal therefrom.

2. The optical data distribution network in accordance with claim 1 wherein the selecting means of each drop includes means for enabling and disabling its first and second optical receivers in accordance with the transmissions of its optical transmitter to choose the receive signal.

3. The optical data distribution network in accordance with claim 1 wherein the selecting means of each drop includes means for enabling its second optical receiver and disabling its first optical receiver during periods of transmission by its optical transmitter to choose the receive signal from the second optical receiver and for disabling its second optical receiver and enabling its first optical receiver during periods of non-transmission by its optical transmitter to choose the receive signal from the first optical receiver.

4. The optical data distribution network in accordance with claim 1 wherein the distributing means includes a reflective star for passively distributing the optical signals.

5. The optical data distribution network in accordance with claim 1 wherein the optical signal directional coupler includes four ports, port 1 through port 4;

wherein the optical transmitter and first optical receiver are coupled to ports 1 and 4, respectively, and the single length of optical fiber and second optical receiver are coupled to ports 2 and 3, respectively; and wherein the optical signal directional coupler is operative to split optical power entering port 1 between ports 2 and 3 and to split optical power entering port 2 between ports 1 and 4.

* * * * *